July 10, 1956
C. J. STEVENS ET AL
2,753,591
APPARATUS FOR HEATING A THERMOPLASTIC WEB
AND FEEDING IT TO AN EMBOSSING MEANS
Filed April 23, 1953
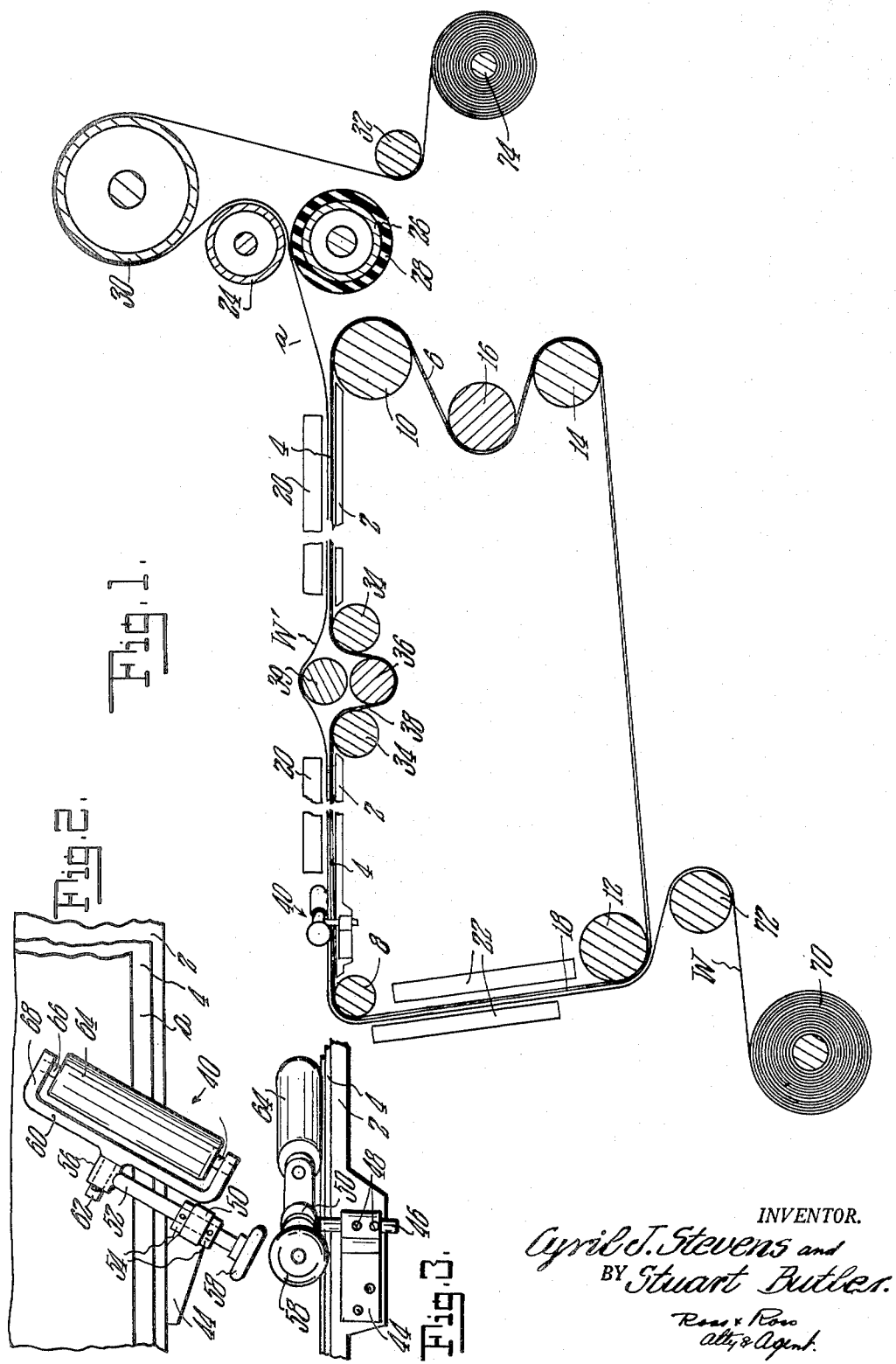
INVENTOR.
Cyril J. Stevens and
BY Stuart Butler.
Ross & Ross
Atty & Agent

United States Patent Office 2,753,591
Patented July 10, 1956

2,753,591

APPARATUS FOR HEATING A THERMOPLASTIC WEB AND FEEDING IT TO AN EMBOSSING MEANS

Cyril J. Stevens, West Springfield, and Stuart Butler, Holyoke, Mass., assignors to B. F. Perkins & Son, Inc., Holyoke, Mass., a corporation of Massachusetts Application April 23, 1953, Serial No. 350,612

1 Claim. (Cl. 18—1)

This invention relates to improvements in embossing apparatus for embossing unsupported plastic material in web form.

The principal object of the invention is directed to improvements in the apparatus for embossing thermoplastic material and the like in web form.

The novel apparatus of the invention is particularly adapted for plastic material which is unsupported or is self-supporting. Plastic materials are well known which on one side thereof have a fabric or paper face by which the plastic is supported or carried. This invention is concerned with plastic material which is not supported by any other medium.

As in U. S. Patent #2,609,568 to Getchell, dated September 9, 1952, embossing is accomplished among other steps by heating the plastic material to soften it.

Considerable difficulty has been experienced, however, with wrinkles which result from heating the web for embossing so that the embossed web does not possess the uniform desired overall embossing.

According to this invention, the unfavorable effects of wrinkles are overcome and thereby the embossed product has characteristics superior to that heretofore known.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a diagrammatic view showing the elements of apparatus of the invention;

Fig. 2 is a plan view of stretch mechanism of the invention; and

Fig. 3 is an elevational view of the mechanism shown in Fig. 2.

Referring now to the drawings more in detail, the invention will be fully described.

An elongated rigid supporting plate or plates 2 supports the upper run 4 of an endless band 6 for movement thereof in the direction of arrow $a$.

The band 6 may be made from various pliable materials but fabricated asbestos has been found to be suitable for the practice of the invention.

Initial and final rolls 8 and 10 are provided over which the band 6 passes. Said band 6 also runs over rolls 12, 14 and 16. One of the rolls may be rotated by any well known means so that the band is moved in the direction of arrow $a$ and functions as a support and carrier for a web W of plastic to be embossed.

Roll 12 is disposed relative to roll 8 so that a substantially vertical run of band is provided as indicated at 18.

Disposed over the support 2 there are elongated heaters indicated by 20 which may be of any desired form adapted to heat and soften the plastic web carried by the band. The heaters may include electrical resistance elements, steam coils or the like. Heaters 22 similar to the heaters 20 are provided adjacent the vertical run 18 of the band 6.

An embossing roll 24 carrying the design with which the web is to be embossed is in cooperative relationship with a roll 26 having a yieldable covering 28 such as rubber or the like. A hollow cooling roll 30 is provided as is a guide roll 32.

Between heaters 20 or between intermediate opposite ends of a single heater there are upper guide rolls 34 and a lower guide roll 36. The upper run of the band passes around the rolls in the form of a loop 38. Above said rolls there is a scrimp or spreader roll 39.

A scrimp or spreader roll is formed to spread material which it supports. Such rolls are well known in the paper and textile industry and spirally arranged ribs or threads of opposite hand extend from the center to outer ends thereof so as to urge the web outwardly from the center.

Spreader devices represented by 40 are disposed on opposite sides of the support 2 adjacent the roll 8. One of said devices will be described in connection with Figs. 2 and 3.

A bracket 44 is secured to the side of support 2 and has a staff 46 adjustable vertically therein by a screw or screws 48. Said staff 46 has a head 50 fixed to its upper end and a rod 52 is adjustable horizontally in said head. Collars 54 are secured to the rod 52 by screws, as shown, to hold the rod 52 in various positions of horizontal adjustment.

A hub 56 is fixed to the inner end of the rod 52 and a manually engageable member such as a wheel 58 is fixed to the outer end thereof.

A yoke 60 has a stem 62 swingable on a horizontal axis in the hub 56 and a roll 64 has opposite ends 66 rotatable in end arms 68 of the yoke 60.

The web of plastic material W is led from a roll 70 thereof around a roll 70 and onto the upwardly moving run 18 of the band by which it is carried past heaters 22.

In this initial heating of the web, it is softened and has a tendency to wrinkle but since the web in traveling upwardly may expand transversely slightly, as it has a tendency to do when heated, it does not wrinkle.

The web as it is carried upwardly onto the horizontal run of the band is in an unwrinkled smooth condition but to insure that it lies flat on the apron to overcome wrinkling marginal portions of the web pass under the rolls 64 of the devices 40.

The devices are so adjusted that the angularity of the rolls 64 and the pressure thereof on the web are such that the rolls exert an outward stretching action on the web to cause it to lie flat in a smooth unwrinkled condition on the band.

The web is carried along by the upper run of the band whereby it is subjected to heating from heaters 20 to condition it for embossing.

At the end of the upper run of the band, the web passes through the bite of the embossing roll 24 and roll 26. In the softened condition, the web is readily embossed. From the embossing roll the web passes around the cooling roll where it is cooled for setting the embossing and finally the web is rewound on an arbor 74.

In some cases it is desirable to act on the web intermediate the ends of the supports in order to smooth out such wrinkles as may have developed subsequent to passing under heater 20. This is accomplished by passing the web as at W' over the scrimp roll 39. This roll as described operates to urge the sides of the web outwardly from the center of the roll so that it returns onto the band in a smooth unwrinkled condition.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Apparatus for use with means for embossing a continuous web of self-supporting stretchable plastic material comprising in combination, an endless flexible web carrying band, a plurality of web supporting rolls arranged in a manner to provide an initial vertical web supporting portion and a final horizontal web supporting portion, heating means adjacent said portions for heating a web on said band, a first and a second rigid support for supporting the horizontal web supporting portion of the band having adjacent inner ends spaced apart to form a gap therebetween, a plurality of guide rolls disposed in said gap and with which the horizontal run of the band is engaged and being arranged to guide said run downwardly from an inner end of the first support and then upwardly and onto the adjacent inner end of the second support, a spreader roll disposed over the guide rolls arranged to receive and support a web of material from off the band at the inner end of the first support and to deliver it to the band at the adjacent inner end of the second support and being adapted to stretch a web transversely, and spreader rolls at opposite longitudinal sides of the first support mounted for rotation on axes disposed angularly relative to the movement of said band and being adapted to overlie and engage opposite edge portions of a web on said band.

References Cited in the file of this patent

UNITED STATES PATENTS

| | | |
|---|---|---|
| 1,975,708 | Bleibler | Oct. 2, 1934 |
| 2,297,645 | Bailey | Sept. 29, 1942 |
| 2,609,568 | Getchell | Sept. 9, 1952 |